United States Patent
Onlek et al.

(10) Patent No.: US 11,982,783 B2
(45) Date of Patent: May 14, 2024

(54) METAL DETECTOR CAPABLE OF VISUALIZING THE TARGET SHAPE

(71) Applicant: NOKTA MUHENDISLIK A.S., Sancaktepe/Istanbul (TR)

(72) Inventors: Mehmet Onlek, Sancaktepe/Istanbul (TR); Basri Kutlu Yavas, Sancaktepe/Istanbul (TR)

(73) Assignee: NOKTA MUHENDISLIK A.S., Istanbul (TR)

( * ) Notice: Subject to any disclaimer, the term of this patent is extended or adjusted under 35 U.S.C. 154(b) by 0 days.

(21) Appl. No.: 16/959,718

(22) PCT Filed: Jan. 5, 2018

(86) PCT No.: PCT/TR2018/050007
§ 371 (c)(1),
(2) Date: Jul. 2, 2020

(87) PCT Pub. No.: WO2019/135726
PCT Pub. Date: Jul. 11, 2019

(65) Prior Publication Data
US 2020/0348436 A1    Nov. 5, 2020

(51) Int. Cl.
*G01B 21/16*    (2006.01)
*G01C 19/00*    (2013.01)
(Continued)

(52) U.S. Cl.
CPC ............... *G01V 3/10* (2013.01); *G01B 21/16* (2013.01); *G01C 19/00* (2013.01); *G01P 15/08* (2013.01);
(Continued)

(58) Field of Classification Search
CPC . G01V 3/10; G01V 3/165; G01V 3/15; G01B 21/16; G01C 19/00; G01P 15/08;
(Continued)

(56) References Cited

U.S. PATENT DOCUMENTS 4,890,064 A    12/1989    Candy
5,790,685 A    8/1998    Sallee
(Continued)

FOREIGN PATENT DOCUMENTS

WO    2012/097416 A1    7/2012

OTHER PUBLICATIONS

International Search Report and Written Opinion of the International Searching Authority for International Patent Application No. PCT/TR2018/050007 mailed Feb. 26, 2019, 11 pages.

*Primary Examiner* — Alesa Allgood
*Assistant Examiner* — Byung Ro Lee
(74) *Attorney, Agent, or Firm* — Bayramoglu Law Offices LLC (57) ABSTRACT

Metal detectors are disclosed herein containing integrated positional tracking unit (20) containing the sensors and processors which provide the detection of the real-time positions of the search head (11) on the ground during metal target (1) searching process, by optical flow technique as (X, Y) points on an image frame at X, Y coordinate plane, following the verification and if required, correction of the parameters of height from the ground, horizontal and axial motions, angular position, focus distance, light quantity and quality; image processing/display unit (30), a shaft mount display and/or a screen, generating the image of the target (1) metal by matching the metal data received from the detector signal processing system (12), thereby from the search head (11) and the location and position data received from the integrated positional tracking unit (20), on a position/image matrix and presenting such image to the user visually.

15 Claims, 3 Drawing Sheets

(51) Int. Cl.
*G01P 15/08* (2006.01)
*G01V 3/10* (2006.01)
*G01V 3/165* (2006.01)
*G06F 18/22* (2023.01)
*G06F 18/25* (2023.01)

(52) U.S. Cl.
CPC .............. *G01V 3/165* (2013.01); *G06F 18/22* (2023.01); *G06F 18/251* (2023.01); *G06V 2201/07* (2022.01)

(58) Field of Classification Search
CPC .. G06K 9/6215; G06K 9/6289; G06V 10/143; G06V 2201/07
USPC ......................................................... 324/329
See application file for complete search history.

(56) References Cited

U.S. PATENT DOCUMENTS

| | | | |
|---|---|---|---|
| 5,886,664 A | 3/1999 | Yujiri et al. | |
| 7,532,127 B2 | 5/2009 | Holman et al. | |
| 8,221,322 B2* | 7/2012 | Wang | A61B 8/4281 600/443 |
| 8,428,390 B2* | 4/2013 | Li | H04N 23/698 345/20 |
| 8,743,219 B1 | 6/2014 | Bledsoe | |
| 9,207,315 B1* | 12/2015 | Plautz | G01S 13/885 |
| 2008/0027648 A1 | 1/2008 | Fujiwara et al. | |
| 2013/0234716 A1* | 9/2013 | Candy | G01V 3/10 324/326 |
| 2013/0321621 A1 | 12/2013 | Menzel | |
| 2014/0152986 A1* | 6/2014 | Trainer | G01N 15/0211 356/336 |
| 2014/0218036 A1* | 8/2014 | Fry | G01V 3/165 324/329 |
| 2017/0102467 A1 | 4/2017 | Nielsen et al. | |

* cited by examiner

METAL DETECTOR CAPABLE OF VISUALIZING THE TARGET SHAPE

CROSS-REFERENCE TO RELATED APPLICATIONS

This application is a National Stage Application of PCT/TR2018/050007, filed 5 Jan. 2018, and which application is incorporated herein by reference. To the extent appropriate, a claim of priority is made to the above-disclosed application.

TECHNICAL FIELD

The present invention relates to the metal detector and the operation method of the mentioned metal detector which is composed of a search head (metal target sensor) and various sensors (image sensor, distance measurement sensor, gyroscope, accelerometer, magnetometer etc.) collecting data by tracking the position of the search head in order to provide the visualization of the geometrical shape of the metal target that is buried or is behind an obstacle, by coordinating the data obtained from integrated positional tracking unit via image processing algorithm.

PRIOR ART

The metal detectors commonly used in the state of the art provide the detection of the existence of the metallic targets buried under the ground (or behind an obstacle) and a rough determination of the type of such metallic targets. The basic operation principle of a metal detector is as follows; generation of a magnetic field by the detector varying as based on time, creation of Eddy (Foucault) currents by this magnetic field which are rotational on a conductive target, behavior of the target as a counter magnetic transmitter due to these Eddy currents and regeneration of a magnetic field, recognition of the magnetic field created by the target, by means of the detector receiver antenna (coil).

While the principle of induction of a current on the target via magnetic field can be realized on the frequency domain by a sinusoidal steady state magnetic field, it can also be as evaluation of the result on the time domain by generation of a magnetic pulse (transient signal). Since the metal detectors can also measure the conductivity/permeability features of the target, they also offer the capability to classify the targets as ferromagnetic or non-ferromagnetic types.

The patent document with the title "Metal Detector Sensing Head with Reduced Eddy Coils" publication number U.S. Pat. No. 4,890,064, dated Nov. 26, 1986 can be given as an example, reference source to the metal detectors mentioned above. In this document a metal detector with a search head which generates and detects a magnetic field is mentioned.

In the state of the art, there are developments concerning the metal detectors in the areas such as data transfer, target position determination, ground tracking, position adjustment etc. These developments mentioned are enabled by various sensors integrated to the metal detectors.

In the state of the art, there is a metal detector mentioned in the patent document with the title "Detection-Object-Position-Specifying Device and Method of Specifying Position of Object to Be Detected", publication number US2008027648. In this document, CCD (Charge Coupled Device) camera operating together with the search head (metal search coils) is mentioned. Joint operation mentioned in the document is defined as a "relative positional relation".

The metal detector mentioned in the document with the publication number US2008027648 displays the position of the target metal, not the geometrical shape of the target metal (the image of the shape). In general, it is a device developed to track the power cables, installations etc. along a line. It does not offer any solutions with respect to the image enhancement and determination of the geometric shape of the targets with unknown geometry.

In the state of the art, there is a metal detector mentioned in the patent document with the title "Motion and Position Measuring for Buried Object Detection", publication number U.S. Pat. No. 7,532,127. In the mentioned metal detector, there are three gyroscopes and three accelerometers in addition to the search head (coils). The purpose of the mentioned structuring is to help the user to keep the detector in the correct position during metal search.

In the state of the art, there is an electronic device mentioned in the patent document with the title "Method for Mapping Hidden Objects Using Sensor Data", publication number US2013321621. The mentioned electronic device aims to determine the image of an object under a surface. According to the document, magnetometer, acoustic sensor, thermal sensor, accelerometer, gyroscope etc. are used for this process. The mentioned electronic device is not related to the underground metal detectors. The mentioned electronic device is developed in order to display the target shape in a medium in which the motions can be controlled mechanically (for example; production line, conveyor band etc.). The process of obtaining the image of an object under the surface is possible by moving the target in a controlled manner. Since it lacks the feature of tracking the random position at the operation place, it cannot offer a solution to realize this function in free state and on site (while the detector is held by hand). The reason for this is that the image sensor is used for the display of the sensor data on the overlaid image rather than tracking the position by "optical flow". While the detector is held by hand on the side, it is required to correct the factors that deviate the data accuracy such as height, axial movement of the sensors, surface differences. The device mentioned in the document with publication number US2013321621 does not have any solutions for these issues. Due to this reason, it is not appropriate for use in free state and on site (while the detector is held by hand). Moreover, no data can be obtained with respect to the depth and structure of the target object in the mentioned device.

In the state of the art, there is an image correction apparatus and method mentioned in the patent document with the title "Image Rotation Correction and Restoration Using Gyroscope and Accelerometer". In the mentioned document, an apparatus and a method for the enhancement of the image obtained from an image sensor with the help of a gyroscope, accelerometer, feedback module, rotation module, verification module and correction module. The mentioned modules use the image de-blurring algorithms. The apparatus and method mentioned in the document with publication number U.S. Pat. No. 8,743,219, is developed for the purpose of image correction and restoration by using a gyroscope and accelerometer. However, it does not offer any solution for obtaining the image of an object that is under the surface or buried. Due to this reason, it does not offer any solution for the use of the mentioned technique in the metal detectors.

In the state of the art, there is an apparatus and method mentioned in the patent document with the title "Method and Apparatus for Detecting Mines Using Radiometry", publication number U.S. Pat. No. 5,886,664. This document mentions the detectors that can sense the shape of the object under the ground (specifically for mines) by using radio waves (radiometry). The mentioned detector is developed specifically for searching mines. High frequency radio waves reach a depth that is less than the detecting depth of the metal detector. Due to this reason, the mentioned detector is not appropriate for use in metal search. The mentioned apparatus uses a radiometer-based method for obtaining the image.

In the state of the art, there are 3 dimensional MEMS (Microelectromechanical Systems) together with accelerometer, gyroscope and magnetometer for axial motion correction in the metal detectors and other areas. In order to track the axial motion, there are units known as IMU (Inertial Measurement Unit) which combine gyroscope, accelerometer and magnetometer sensors (those generally used for air and marine traffic). IMU is used in order to measure 3-axis acceleration and 3-axis rotation power generated on an object moving in space. The mentioned sensor and devices are used in the metal detector technology in order to correct the user's hand (so that the detector is kept at correct position).

In the state of the art, there is a metal target detection and imaging device and method mentioned in the patent document with the title "Apparatus and Method for Detecting and Imaging Metal", publication number U.S. Pat. No. 5,790,685. An optical method is not used for the detection of motion in the mentioned imaging device. This method is used by the motion of the target, not the detector. Accordingly, the mentioned method is appropriate for the security detectors. There is no solution concerning the free motion of the coils of the detector, in the mentioned document. It is not possible to use the mentioned imaging method for hand-held detector which is moved independently (random).

The current state of some of the related concepts can be explained as below:

Tracking of position of the detector search head (coil) on the surface (ground) in real-time is possible by optical detection (knowing X and Y coordinate positions). Optical detection is a method used in various areas. Basically, it is defined as "Optical Flow" detection. This method enables the detection of X and Y positions by measuring them over a sliding (moving on the ground) image (proportionality of the real image and the image falling on the optical sensor) and measuring them by establishing specific connections. For this purpose, it is required to know the distance of the image sensor from the sliding surface and to include such distance into calculation. A hand-held metal detector is subject to various intentional and/or unintentional movements (axial, circular) of the user during searching. In this case, such a position measuring system for the hand-held metal detectors is required to be adequate for calculating the mentioned movements.

With the image processing methods of the state of the art, it is possible to obtain net images from the images with deformed focal points. For example, there is a certain quantity of signals in a superposed manner, in a blurred image to provide the correction of the focal point and increase the clarity. Generation of blur is expressed by a function composed of totals, convolution. The basic definition of convolution is the formation of the original of the superposed signals as the integral total. In this case, one of the methods that can be used for the correction of the mentioned blur is deconvolution. The term "deconvolution" in the field of optics and imaging is defined as the process of reversing the optical deformation realized in an optical imaging device.

SHORT DESCRIPTION OF THE INVENTION

The present invention relates to the metal detector and the operation method of the mentioned metal detector which is composed of a search head (metal target sensor) and various sensors (image sensor, distance measurement sensor, gyroscope, accelerometer, magnetometer etc.) collecting data by tracking the position of the search head in order to provide the visualization of the geometrical shape of the metal target that is buried or is behind an obstacle, by coordinating the data obtained from integrated positional tracking unit via image processing algorithm, and it is characterized by;

collecting the metal signals as based on their positions, by moving the search head randomly over a buried metal target and display of the geometrical shape of the buried target (visual) with a distinguishable clarity by taking advantage of the position data of the search head.

DESCRIPTION OF THE INVENTION

The invention is basically composed of a positional tracking unit integrated to the hand-held metal detector and a device with display that combines, processes the data received from the metal detector search head and the mentioned positional tracking unit, and transfers these visually to the user.

The characteristics of the metal detector that can visualize the target shape are;

utilization of a positional tracking unit in the metal detector (tracking the search head position) in order to obtain the cross-sectional image of the buried metal target;

expression of the size of the target by length measuring units;

collecting the data in a natural way (with random search movements) without any need for a special manner of moving the metal detector (at a constant speed, in a single direction);

ability to reanalyze under different conditions by changing the parameters of the metal detector (sensitivity, soil adjustment, thresholds, metal filtering etc.) following the scan without any need for re-search;

enhancement of the image by multi-search of the same position by joint assessment of the position and the signal content received from the metal target.

The metal detector that can visualize the target shape is composed of three main functional parts. These parts are defined as the metal detector (search head and detector signal processing system), integrated positional tracking unit and image processing/display unit. These parts can be integrated physically within themselves or can communicate with and/or without cable (can transmit data).

One of the functional parts, the metal detector, is any metal detection device with typical VLF or pulse induction of magnetic receiver which can detect the magnitude of the signal and/or metal characteristics data in real-time related to the metal constituting the target. In these devices, basically, there is a metal detector search head which generates Eddy currents on the target using magnetic induction and detects the magnetic field created with the reaction of the target, and a detector signal processing system handling and processing such signals. In the metal detector part, the devices such as magnetometers/gradiometers, which are sensitive to the ferromagnetic targets (iron, cobalt, nickel etc.), can also be used. The metal detector part elements are placed on a shaft so that the user can carry the system by hand and carry out the metal search process in an ergonomic manner. Within the structure of the mentioned signal processing system, there is a communication/connection unit that can transfer the metal data in real-time to the other internal and/or external systems using digital and/or analog methods in addition to a signal generation/processing and affiliated audio warning system found in a typical metal detector. Usually, as based on the detector technology used, the data obtained by the metal detector can be expressed as the amplitude and phase of the return signal as well as ferromagnetic and conductivity components. Ideally, the amplitude and phase of the return signal is used in the metal detector of the present invention. To summarize, the part serving as the metal detector is basically composed of a search head and detector signal processing system. The search head is the part which generates Eddy currents on the buried metal target and detects the magnetic field signals occurring on the target as a result of these currents. The detector signal processing system is the part which processes and interprets the metal target signals sensed by the search head. Being specific to the purpose and operation method of the invention; there is a communication/connection unit within the structure of the detector signal processing system which transmits the metal target signals to the other internal and/or external systems as processed or preprocessed or raw.

Another functional part, integrated positional tracking unit is located on the metal detector shaft. The integrated positional tracking unit is required to move jointly with the search head and be at any position to face to the ground. The integrated positional tracking unit basically operates with optical flow detection technique. For a sensor to operate practically with optical flow detection technique, it is required to detect its height from the ground tracked and its position around the vertical axis (yaw). This requirement in the invention structuring is provided with the integrated sensor structuring for which the details are provided below. In other words, integrated positional tracking unit is composed of a sensor and processors that operate jointly and in a coordinated manner.

The integrated sensor structuring generating the mentioned integrated positional tracking unit generally composed of (it may include all or an appropriate combination of the following):

The image sensor providing the detection of two dimensional (on X and Y plane) image frame of the ground searched by the metal detector (search head) and the optical flow processor providing the calculation of the relative movement quantity of the mentioned image sensor on the horizontal (X and Y) axis; (The image sensor and the optical flow processor can be separate elements in contact with each other or can be integrated)

The objective providing the detection of the ground image detected by the image sensor in a manner to cover a wide area, in other words, as DoF (Depth of Field), during the searching process performed by the metal detector; Moreover, as a separate version, the objective provides the ground image detected by the image sensor to focus on a specific height during the searching process performed by the metal detector. (When the ground height or the height which the user is holding the detector changes, it provides the image stability by adjusting the focus.)

Non-contact distance measurement sensor (ultrasonic, laser, radio frequency [RF], infrared [IR] etc. sensor) of the image sensor providing the real-time recognition of the height above the ground;

IMU sensor containing one or all of the gyroscope and accelerometer sensors, providing the detection of the probable rotational (bending, yawing) movements of the image sensor during the searching process performed by the metal detector; (IMU sensor provides the automatic correction of the movement data of the image sensor on X and Y axis relative to its own axis according to the mentioned X and Y axis even if a rotational movement occurs on the vertical axis);

Based on the operational conditions of the image sensor; infrared (IR) and/or at least one external or internal lighting element on the visible light band providing the local illumination of the ground for the dark or dim light conditions of the ground where detection is difficult;

When infrared (IR) lighting is used in place of the natural light; cold mirror filter providing the reduction of the deforming effects of the lights received from the exterior environment, on the illuminated ground.

Movement (position) and rotation (roll, pitch, yaw) data based on X, Y, Z axis obtained by the integrated positional tracking unit are transferred to the image processing and display unit as processed or preprocessed or raw. This transfer process can be realized with or without cable. The integrated positional tracking unit sensors operate in coordination with the metal detector sensors (search head). The data obtained from the integrated positional tracking unit is evaluated together with the data obtained from the metal detector search head. Accordingly, (corrected) X, Y position data for each point searched by the search head collection and the metal existence for such point (amplitude and phase) data are collected at the image processing and display unit. Real-time metal detector data detected for each point on the ground are combined at the image processing and display unit.

The image processing and display unit includes at least one processor and memory capable of image processing. The data transferred to and processed at the image processing and display unit are visualized as two dimensional or three dimensional contour lines and are presented to the user as visuals (colored, deblurred) using a shaft mount display and/or a screen. Preferably, a display or a projection or VR spectacles technology with sufficient features can be used in order to view these colored visuals with high resolution. The image processing and display unit can be a fixed unit connected directly on the detector structure or it can be as a equipment with display which can be carried by the user. External mobile devices such as a tablet or a mobile smart phone etc. can be used as the image processing and display unit. Accordingly, the target image can be displayed on the tablet and/or the mobile smart telephone displays.

The image of the metal target is created in the image processing and display unit by utilization of the metal data received from the search head and position data received from the integrated positional tracking unit, in various digital image processing and generation algorithms. Joint assessment of the metal target data and the position data of the search head obtaining such data and visualization at image processing/display unitare enabled by the operation method of the present invention.

The present invention is explained in more detail below, through the references by mentioning the figures listed below:

| Legend | |
|---|---|
| NO | NAME OF THE PART |
| 1 | Target |
| 10 | Metal detector |
| 11 | Search Head |
| 12 | Detector signal processing system |
| 13 | Shaft |
| 20 | Integrated positional tracking unit |
| 21 | Image sensor |
| 22 | Objective |
| 23 | Optical flow processor |
| 24 | Distance measurement sensor |
| 25 | IMU sensor |
| 26 | Lighting element |
| 27 | Cold mirror filter |
| 30 | Graphic processing/imaging unit |
| 31 | Shaft mount display |
| 32 | Screen |
| 40 | Communication unit |

DETAILED DESCRIPTION OF THE INVENTION

Figure 1:
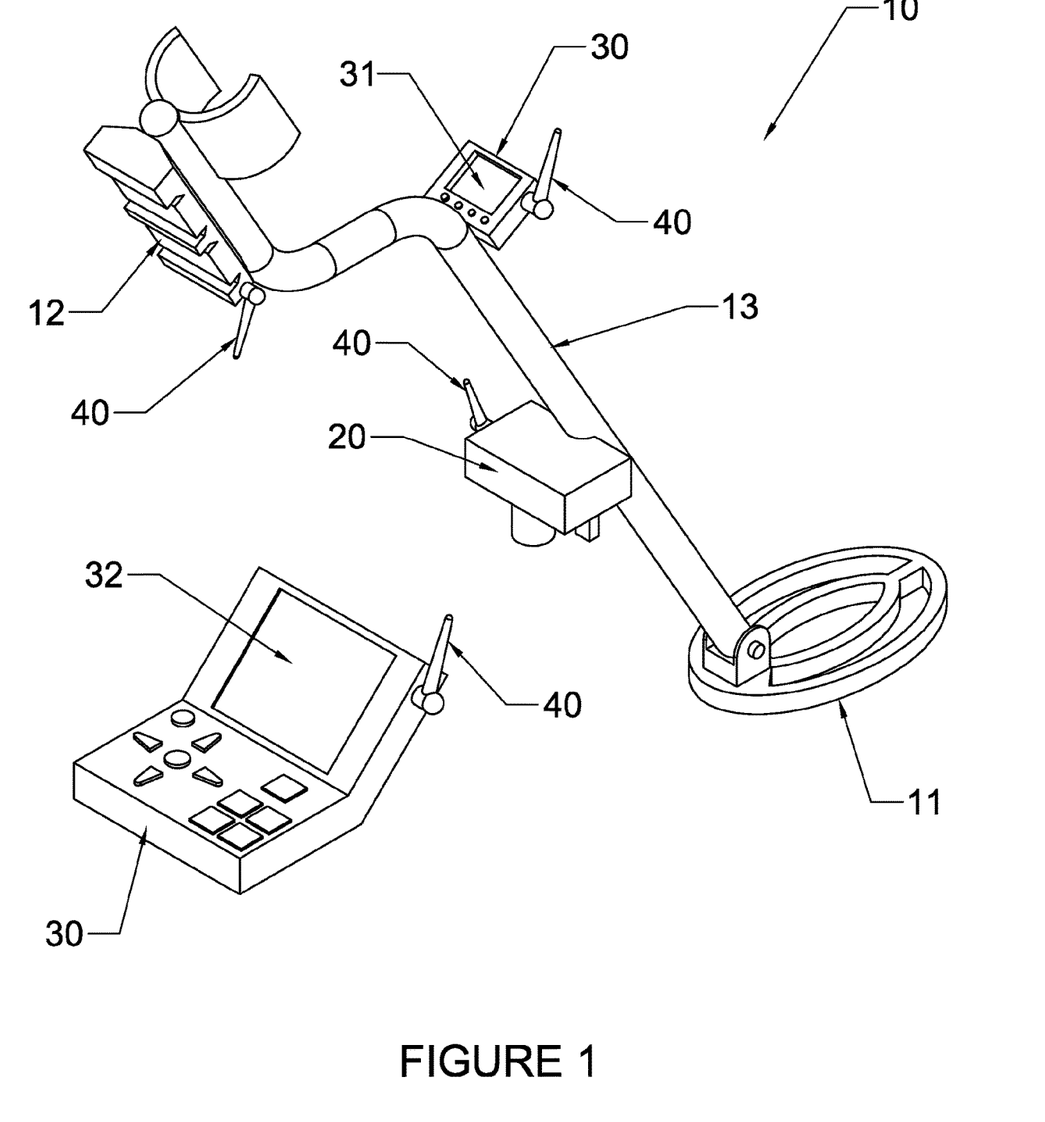
FIG. 1: It is the general perspective view of the metal detector visualizing the target shape.
Figure 2:
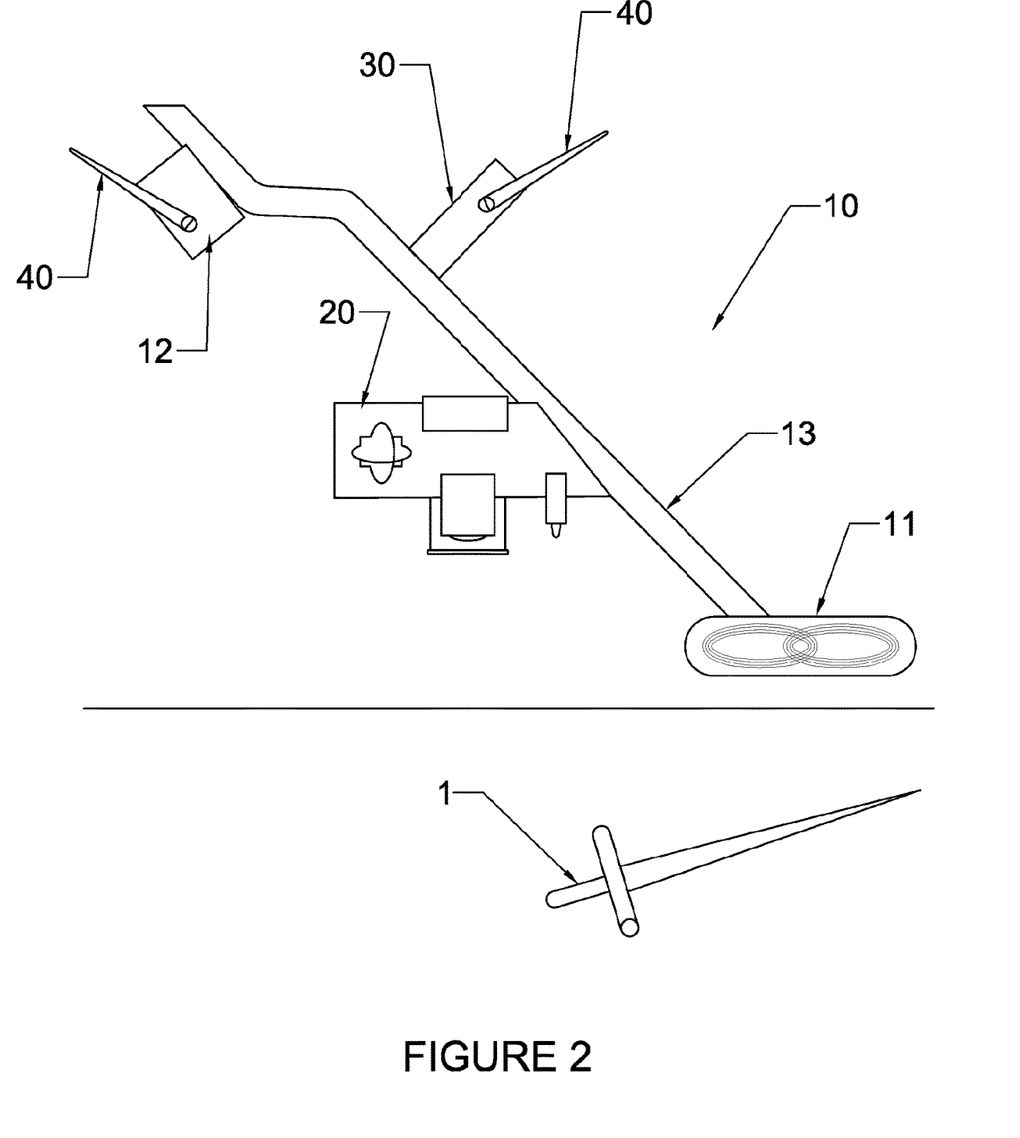
FIG. 2: It is the side view of the metal detector visualizing the target shape.
Figure 3:
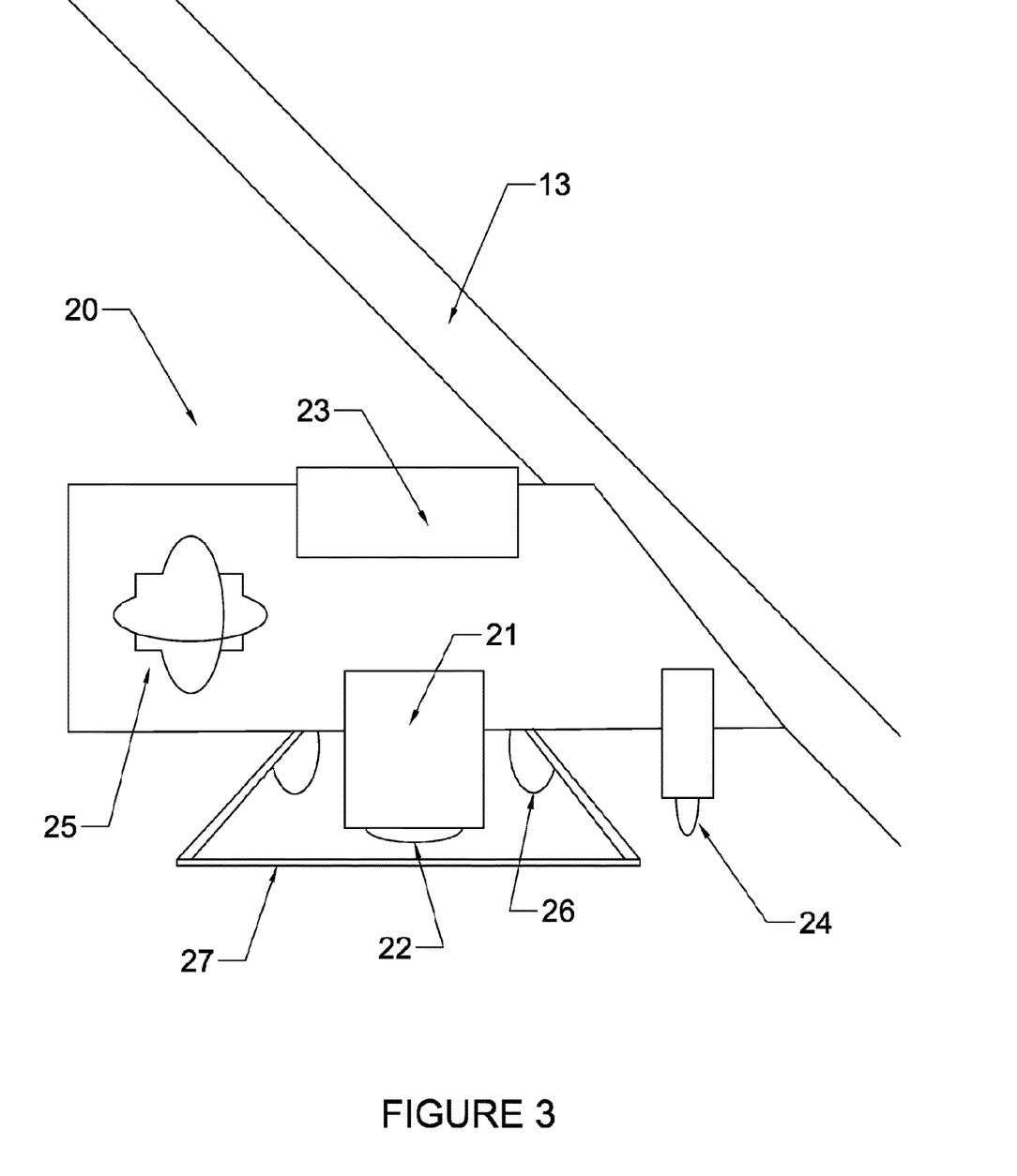
FIG. 3: It is the detailed view of the integrated positional tracking unit.

The present invention relates to the metal detector (10) which can detect the data in real-time related to the magnitude of the signal and/or the metal characteristics concerning the metal that constitutes the target (1), by means of a search head (11) at the end of a shaft (13) which the user holds by hand and searches the metal target (1) and the detector signal processing system (12) which processes the signals detected by the search head (11) and it is characterized by containing;

integrated positional tracking unit (20) containing the sensors and processors which provide the detection of the real-time positions of the search head (11) on the ground during metal target (1) searching process, by optical flow technique as (X,Y) points on an image frame at X, Y coordinate plane, following the verification and if required, correction of the parameters of height from the ground, horizontal and axial motions, angular position, focus distance, light quantity and quality;

image processing/display unit (30), a shaft mount display and/or a screen, generating the image of the target (1) metal by matching the metal data received from the detector signal processing system (12), thereby from the search head (11) and the location and position data received from the integrated positional tracking unit (20), on a position/image matrix and presenting such image to the user visually;

at least one image sensor (21) located within the structure of integrated positional tracking unit (20) positioned on the metal detector shaft (13) at a position to face to the ground searched by the search head (11) and providing the detection of the ground searched by the search head (11) as two dimensional (on X and Y plane) image frame;

optical flow processor (23) providing the detection of (X, Y) points located within the structure of integrated positional tracking unit (20), which the image sensor (21) and thereby the search head (11) passes through in the area swept by the image sensor (21) and accordingly, calculation of the relative movement quantity of the image sensor (21) and thereby the search head (11) on the horizontal (X and Y) axis;

IMU sensor (25) containing at least one accelerometer and/or at least one gyroscope providing the detection of the changes in the angular position and/or linear speed of the metal detector (10) as based on the axis, that is manually used by the user during the process of positioning of (X, Y) points located within the structure of integrated positional tracking unit (20), which the image sensor (21) and thereby, the search head (11) passes through, on the image frame at the relative X, Y coordinate plane by the optical flow processor (23);

objective (22) positioned within the structure of the integrated positional tracking unit (20) in a manner to face to the ground, which provides the ground image detected by the image sensor (21) to focus stably on changing heights;

processor located within the structure of image processing/display unit (30), a shaft mount display and/or a screen, providing the performance of interpolation for the potential missing points by generating the mentioned position/image matrix and activation of the digital image processing algorithm on the position/image matrix.

The target (1) is defined as any metal object that is buried or behind an obstacle in the area which is subject to metal search process by a metal detector (10).

The metal detector (10) is defined as the metal sensing device that can detect the magnitude of the signal related to the metal constituting the target (1) and/or the metal characteristics data in real-time.

The search head (11) is the part with receiver and transmitter antennas (coils) generating Eddy currents on the buried metal target (1) and detecting the magnetic field signals occurring on the target (1) as a result of such currents. The user performs the metal target (1) scan process by moving the search head (11) over the ground.

The detector signal processing system (12) is the system that processes the target (1) signals detected by the search head (11) and converts them into meaningful data and if required, categorizes them. There is a communication unit (40) within the structure of the detector signal processing system (12) providing the transfer of the obtained data to other internal and/or external systems and receiving of the data transferred from such systems.

The integrated positional tracking unit (20) is the unit that contains integrated sensor and processors that detect the real-time positions of the search head (11) on the ground during the metal target (1) searching process, as visual and digital data using optical flow technique by performing the verifications and if required, corrections for the height from the ground, horizontal and axial motions, focusing, lighting. There is a communication unit (40) in the integrated positional tracking unit (20) providing the transfer of the data obtained to the other internal and/or external systems and obtaining the data transferred from such systems.

The image sensor (21) is the device that provides an image of the ground searched by the search head (11) to be perceived as two dimensional (on X, Y plane) image frames.

The objective (22) is the system located within the structure of the integrated positional tracking unit (20) in a manner to face to the ground, providing the ground image detected by the image sensor (21) to focus stably as based on the changing heights.

The optical flow processor (23) is the processor providing the calculation of the relative movement quantity of the image sensor (21) and (thereby the search head (11)) on the horizontal (X and Y) axis.

Distance measurement sensor (24) is the sensor that provides real-time non-contact recognition of the height of the image sensor (21) above the ground. Ultrasonic, laser, radio frequency [RF], infrared [IR] etc. sensor can be used as the distance measurement sensor (24).

IMU sensor (25) is the device that detects and collects the angular speed and linear acceleration data. IMU sensor (25), ideally is composed of gyroscope and accelerometer sensors. A hand-held metal detector (10) is exposed to various intentional and unintentional (axial, circular) actions of the user during metal target (1) searching process. The optical flow processor (23) tracks the movements of the image sensor (21) (and thereby, the search head (11)) on the horizontal axis. In addition to the optical flow processor (23), an accelerometer is used in order to transfer the horizontal and axial movements of the image sensor (21) (and thereby, the search head (11)), to the track of X and Y plane. A gyroscope is used for tracking the axial movements of the image sensor (21) (and thereby, the search head (11)) to be performed on the vertical axis. IMU sensor (25) in which the accelerometer and gyroscope coexist and work in coordination, provides automatic correction of the movement data of the image sensor (21) on X and Y axis relative to its own axis, in relation to the mentioned X and Y axis, even if a rotational movement occurs on the vertical axis.

Lighting element (26) is composed of infrared (IR) and/or visible light sources providing local illumination of the ground so that the images with the required definition can be obtained by the image sensor (21) even in mediums with insufficient lighting or with inappropriate light quality.

The cold mirror filter (27) is the filter that provides the reduction of the deforming effects of the light received from an external source, on the ground which is illuminated with the lighting element (26), when lighting function is realized with infrared light source rather than natural light.

The image processing/display unit (30) is the unit which generates the image of the target (1) metal by matching the metal data received from the detector signal processing system (12) (thereby, the search head (11)) with the location and position data received from the integrated positional tracking unit (20) and presents this image to the user visually. The image processing/display unit (30) includes at least one processor and memory with the capability of image processing. The image processing/display unit (30) can be on a metal detector (10) shaft or as a separate unit. The image of the target (1) is displayed for the user on a shaft mount display (31) on the metal detector (10) shaft (13) or on a screen (32) within the structure of a separate image processing/display unit (30).

The communication unit (40) is the communication utility with or without cable, which provides the transfer of the data obtained from the detector signal processing system (12) and integrated positional tracking unit (20), to the image processing/display unit (30), a shaft mount display and/or a screen, in a coordinated manner.

A sample structuring of a metal detector (10) which can visualize the shape of the target (1) is as follows:

The metal target (1) detection function of the metal detector (10) is realized by means of its search head (11). The search head (11) is located at the end of a shaft (13). On the other end of the shaft (13) there is a holding section which enables the user to hold the metal detector (10) in his hand and make a searching. The search head (11) is connected, with or without cable, to the detector signal processing system (12) on the shaft (13). The mentioned connection, provides the signal transmission from the search head (11) to the detector signal processing system (12) (or vice versa). There is a communication unit (40), with our or without cable, on the detector signal processing system (12) providing the communication with the integrated positional tracking unit (20) and image processing/display unit (30).

On the mentioned shaft (13), there is an integrated positional tracking unit (20) at a position which can track the ground searched by the search head (11). The image sensor (21), objective (22) and distance measurement sensor (24) in the integrated positional tracking unit (20) equipment are at a position to face to the ground. Optional lighting element (26) and cold mirror filter (27) are also at a position to perform the illumination function on the ground. The optical flow processor (23) and IMU sensor (25) are in the integrated positional tracking unit (20) equipment. In the integrated positional tracking unit (20) there is a communication unit (40) with or without cable, which provides the communication with the detector signal processing system (12) and image processing/display unit (30).

The image processing/display unit (30) can be located on the metal detector (10) shaft and/or as a separate unit. There is at least one display within the structure of the image processing/display unit (30). The image processing/display unit (30) display located on the metal detector (10) shaft is identified as a shaft mount display (31); and if it is the display of a detector signal processing system (12) as a separate unit, then it is identified as a screen (32). There is at least one processor operating the image processing algorithm and at least one memory within the image processing/display unit (30) equipment. In the image processing/display unit (30), there is a communication unit (40) with or without cable, which provide communication between the integrated positional tracking unit (20) and detector signal processing system (12). The data from the integrated positional tracking unit (20) and detector signal processing system (12) are matched by the image processing/display unit (30) processor as search head (11) position and the detected target (1) metal signal and are visualized by digital image processing technique.

Optionally, there is a button or a motion-sensitive (collects data as the search head (11) is moved) switch sensor in the metal detector (10) which starts and stops the data collection process with the search head (11).

A sample operation method of the metal detector (10) that can visualize the target (1) shape is as follows:

It is the method of obtaining the image of a target (1), which is buried or is behind an obstacle, by a metal detector (10) which has an integrated positional tracking unit (20) composed of various sensors collecting data by tracking the position of the search head (11) and image processing/display unit (30), a shaft mount display and/or a screen, generating the image of the target (1) metal and presenting it as a visual to the user in addition to the search head (11) at the end of a shaft (13) held by the user, which provides the searching of the metal target (1) and a detector signal processing system (12) processing the signals detected by the search head (11), and it is characterized by the steps of;

Detection of the metal target (1) position as an area by using the known metal search and detection system of the metal detector (10);

Moving the search head (11) freely by the user in a manner to scan the area with the target (1) and accordingly, collection of the metal signals belonging to the target (1); (Here, the user can start and stop the scan by a button or data can be collected only when moving by means of a motion-sensitive switch sensor.)

Simultaneously with the data collection of the search head (11), imaging of the searched area in the form of an image frame positioned by X and Y coordinate plane by the image sensor (21) and detection of the (X, Y) points, through which the image sensor (21) and thereby, the search head (11) passes, in the area swept by the image sensor (21), with the help of optical flow processor (23);

If the user changes the height of the metal detector (10) from the ground, which is freely held in his hand, during the positioning of the (X, Y) points, through which the search head (11) passes by means of the image sensor (21), in the image frame thanks to the optical flow processor (23); detection of this change by non-contact distance measurement sensor (24) within the structure of the metal detector (10);

If the user changes the angular position and/or linear speed of the metal detector (10) as based on the axis, which is freely held in his hand during positioning of the (X, Y) points, through which the search head (11) passes by means of the image sensor (21) in the mentioned image frame thanks to the optical flow processor (23); detection of such changes by IMU sensor (25) within the structure of the metal detector (10) and correction of the relevant point by coordinate rotation methods according to a relative axis on the Cartesian coordinates;

Transfer of the corrected digital image data of the target (1) (metal) signal data detected by the search head (11) and the points through which the search head (11) passes, to a image processing/display unit (30) within the structure of the metal detector (10) and/or separate from the structure of the metal detector (10);

Matching the target (1) (metal) signals detected by the search head (11) with the points through which the search head (11) passes and accordingly, detection of the points with the metal target (1) signal on the searched area measured by the image sensor (21);

Placement of the points matched by the metal data on a position/image matrix which is defined by X and Y indices;

Completion of the missing points in the position/image matrix, by the nearby coordinates using interpolation;

Operation of a deconvolution process on the position/image matrix, which accepts the shape of and the area covered by the predefined search head (11) as a parameter as based on the intensity of the metal data received; (the selected deconvolution method and parameters can vary as based on the shape of the search head (11));

As a result of the deconvolution; visualization with 3D contour lines in different colors, of the kinds of metal (iron, gold, silver, bronze) at the target (1) on the shape, together with the shape of the visual and presentation to the user using a shaft mount display (31) and/or screen (32).

Deconvolution is the process of application of a known or potential reverse function of deformation (filtering) in an image/signal, to the deformed image/signal. The shape of the search head (11) is influential on the deformation during the detection of the integrity of the metal and algorithms appropriate for deblurring can be preferred as based on the experimental performance.

The image obtained following the deconvolution is clearer when compared to the blurred image in the first position/image matrix. The deconvolution method appropriate for the search head and target type can be detected and based on trial and error method. Among the deconvolution methods worked on; linear deconvolution such as Wiener Inverse Filter can be applied as well as nonlinear iterative deconvolution algorithms such as Maximum Likelihood (ML), Maximum Entropy (ME), Pixon, "Blind/Myopic", Lucy-Richardson, Maximum a Posteriori and Iterative Least Squares (non-linear).

The invention claimed is:

1. A metal detector configured to detect in real-time or at intervals data related to a magnitude of a signal and/or a characteristic of a metal that constitutes a target, by means of a search head, having a transmitter antenna configured to generate an Eddy current on the target and a receiver antenna configured to detect magnetic field signals occurring on the target as a result of the Eddy current, said search head being disposed at an end of a shaft which a user holds by hand and scans the target, and a detector signal processing system which processes the magnetic field signals detected by the search head, the metal detector comprising:

an integrated positional tracking unit configured to detect a real-time position of the search head on a ground during a target searching process by an optical flow technique as (X, Y) points on an image frame at an X, Y coordinate plane defining an image of the target, following verification and correction of a parameter selected from height from the ground, horizontal and axial motions, angular position, focus distance, light quantity and quality, wherein the integrated positional tracking unit includes an inertial measurement unit (IMU) sensor containing at least one accelerometer and/or at least one gyroscope configured to perform a detection of a rotational motion, of the integrated positional tracking unit, that is a roll relative to a horizontal axis in the X,Y coordinate plane performed by the user, wherein the integrated positional tracking unit is configured to correct the (X, Y) points to account for said rotational motion based on the detection of the rotational motion;

an image processing/display unit, wherein the image processing/display unit is configured to match the magnetic field signals to the corrected (X,Y) points in a position/image matrix of the image of the target to generate the image of the target based on the real-time position of the search head and on the matched magnetic field signals, and a shaft mount display and/or a screen configured to display the image to the user.

2. The metal detector according to claim 1, further comprising an image sensor located within a structure of integrated positional tracking unit positioned on the shaft at a position to face to the ground searched by the search head, and said image sensor performing detection of said real-time position of the search head on the ground as the image frame.

3. The metal detector according to claim 2, further comprising an optical flow processor configured to perform the optical flow technique located within the structure of integrated positional tracking unit, which the image sensor and thereby, the search head passes through in the area swept by the image sensor and accordingly, wherein the optical flow processor is configured to perform calculation of a relative movement quantity of the image sensor on the horizontal axis.

4. The metal detector according to claim 2, further comprising a distance measurement sensor positioned within the structure of the integrated positional tracking unit to face the ground, wherein the distance measurement sensor is configured to provide real-time non-contact recognition of a height of the image sensor above the ground.

5. The metal detector according to claim 2, further comprising an objective positioned within the structure of the integrated positional tracking unit to face the ground, wherein the objective is configured to focus changing heights to provide a ground image detected by the image sensor.

6. The metal detector according to claim 2, further comprising a lighting element which provides local illumination of the ground.

7. The metal detector according to claim 6, further comprising a cold mirror filter configured to reduce deforming effects of light received from an external source, on the ground which is illuminated with infrared (IR) light by the lighting element.

8. The metal detector according to claim 1, further comprising a processor located within a structure of the image processing/display unit, the shaft mount display and/or the screen, wherein the processor is configured to perform an interpolation for potential missing points by generating the position/image matrix and to activate a digital image processing algorithm on the position/image matrix.

9. The metal detector according to claim 1, wherein the shaft mount display and/or the screen is configured to provide in said image a geometrical shape of the target with 3D contour lines in different colors for kinds of metal of the target.

10. The metal detector according to claim 1, further comprising a communication unit configured to data obtained from the detector signal processing system and the integrated positional tracking unit, to the image processing/display unit, the shaft mount display and/or the screen, in a coordinated manner.

11. The metal detector according to claim 1, further comprising a magnetometer and/or gradiometer sensitive to ferromagnetic targets for metal detection processes.

12. The metal detector according to claim 1, wherein the image processing and display unit is a tablet computer or a smart phone.

13. A method of obtaining an image of a target, which is buried or is behind an obstacle, by a metal detector which has an integrated positional tracking unit composed of various sensors collecting data by tracking a position of a search head and an image processing/display unit, a shaft mount display and/or a screen, by generating the image of the target and presenting the image visually to a user, wherein the search head is disposed at an end of a shaft held by the user, which provides searching of the target, and the metal detector includes a detector signal processing system that processes a signal detected by the search head, the method comprising:

detecting a position of the target in an area using the metal detector;

moving the search head by the user in a manner to scan the area with the target and collecting a plurality of metal signals from the target;

simultaneously with the collecting the plurality of metal signals, imaging the searched area to collect digital image data of the target in a form of an image frame positioned by an X and Y coordinate plane defining the image of the target by an image sensor, and detecting a plurality of (X, Y) points of the X and Y coordinate plane through which the image sensor and thereby, the search head, passes;

detecting a rotational motion, of the search head, that is a roll relative to a horizontal axis in the X,Y coordinate plane performed by the user;

correcting the plurality of (X, Y) points to account for said rotational motion based on the detecting the rotational motion;

transferring the digital image data of the target and the corrected plurality of (X, Y) points to an image processing/display unit;

matching the plurality of metal signals to the corrected plurality of (X, Y) points in a position/image matrix of the image of the target to generate the image of the target based on the matched plurality of metal signals     performing a deconvolution process on the position/image matrix based on intensity of the plurality of metal signals; and     based on the deconvolution process, generating and displaying the image of the target with different indications denoting different kinds of metal at the target, together with a shape of the target using the shaft mount display and/or the screen.

14. The method according to claim 13, further comprising:

detecting a change by a non-contact distance measurement sensor within a structure of the metal detector and implementing an adjustment of a focal distance by an objective in order to correct the image of the target in response to the user changing a height of the metal detector during the detecting of the plurality of.

15. The method according to claim 13, further comprising determining missing points in the position/image matrix, using interpolation.

\* \* \* \* \*